UNITED STATES PATENT OFFICE.

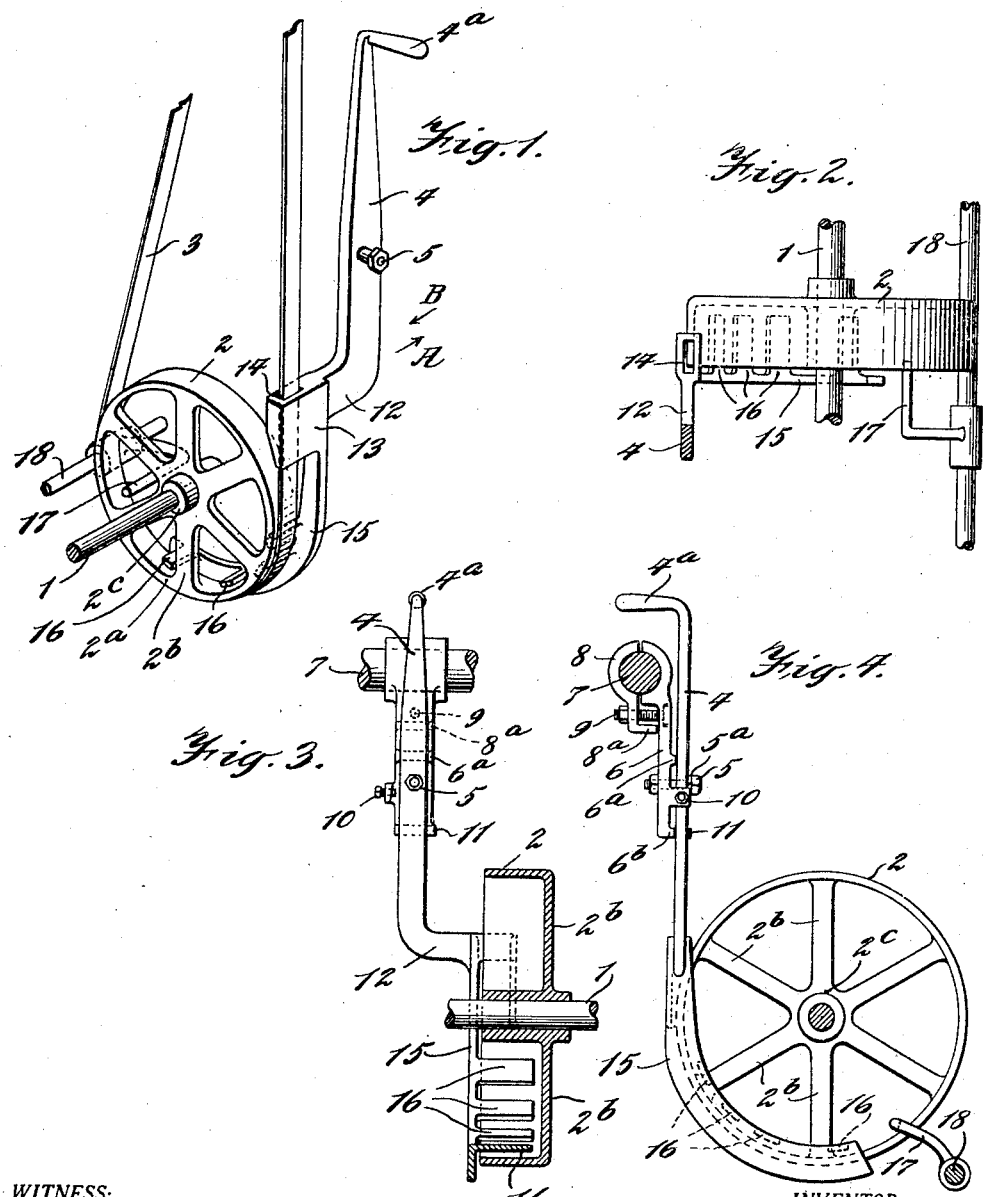

CORNELIUS E. LOOSE, OF NEW YORK, N. Y.

BELT-SHIFTER.

1,357,881.    Specification of Letters Patent.    Patented Nov. 2, 1920.

Application filed October 23, 1919. Serial No. 332,599.

*To all whom it may concern:*

Be it known that I, CORNELIUS E. LOOSE, a citizen of the United States, residing at the city of New York, in the county of New York and State of New York, have invented certain new and useful Improvements in Belt-Shifters, of which the following is a full, clear, and exact description.

An object of my invention is to provide a belt shifter, which will be simple and inexpensive in construction, which will be reliable in its operation and which will dispense with the use of extra pulleys and the like for holding the belt in proper position to be reapplied to the driving pulley when removed therefrom. Another object is to minimize the movement required in shifting the belt to its off and on positions. Still other objects and advantages of my invention will appear from the following description.

In accordance with my invention I provide a belt shifting lever which includes a belt guiding portion for shifting the belt as the lever is operated, and which carries belt receiving and holding means, such as a flange or fingers, preferably curved substantially to the periphery of the driving pulley. These fingers or the like may be designed to enter within the flange of the pulley when the parts are in driving position and may extend for a substantial distance around the portion of the pulley over which the belt runs, or they may be of relatively short arcuate length and be supplemented by stationary guide and holding members for the belt.

I shall now describe the illustrated embodiment of my invention and shall thereafter point out my invention in claims.

Figure 1 is a perspective illustrating the application of my invention to a driving pulley and belt.

Fig. 2 is a plan of a pulley and my improved shifter.

Fig. 3 is a central sectional elevation of the same, and

Fig. 4 is a side elevation of the same.

Mounted in the frame of the machine to which this invention is applied, is a main driving shaft 1, carrying thereon a driving pulley 2 which drives another pulley (not shown) by means of a belt 3. The pulley comprises a flange $2^a$ having at one end thereof a plurality of spokes $2^b$ which support the flange from the hub $2^c$.

The illustrated belt shifter comprises a lever 4, pivoted by means of a bolt 5 upon an arm 6 which is dependingly supported upon one of the rods or pipes of the supporting frame of the machine by means of a complementary member 8 and bolt 9. The projection $8^a$ of the complementary member bears against the depending arm 6 and the arm and complementary member are drawn toward each other by the bolt 9 and thus firmly clamped to the rod 7. Bearing lugs or projections $6^a$ and $6^b$ on the depending arm 6, serve to steady the lever in its oscillatory movements, and a split lock washer $5^a$ on the bolt 5 holds the lever frictionally in any adjusted position. The depending arm 6 is provided with an adjustable limit stop 10 and a fixed opposing limit stop 11. The lever 4 may be operated by a handle $4^a$, and below its pivot, it is provided with an offset arm 12 carrying thereon a belt guide 13 which in the embodiment illustrated is a boss with an aperture 14 for the passage of the belt therethrough. Obviously any suitable guide may be substituted for the one shown. Depending from the offset arm 12 is an arm 15 which is preferably curved to lie substantially adjacent the flange of the pulley, and this arm 15 has laterally projecting therefrom belt receiving and holding means 16 which may comprise a flange, fingers, or the like. The belt receiving and holding means is disposed on an arc which is of less radius than the inner radius of the flange of the pulley so that when the lever is shifted to cause the belt to ride upon the pulley to form a driving action therewith, the belt receiving and holding means will pass within the flange of the pulley and thus be out of the way, and minimize the movement required in shifting the belt to its off and on positions. The arm 15 and the means 16 carried thereby are disposed from the guide 13 for a substantial distance along the underside of the pulley, preferably through an arc of about 90° or 100° although a shorter arc may be used and be supplemented by a stationary guide and holding means. In the latter case, the stationary means may conveniently comprise an arm 17 or the like, projecting slightly within the flange of the pulley and carried by one of the supporting frame rods 18.

Assuming the lever to be in the position shown in Fig. 1, the belt is running on the flange of the pulley and is being driven thereby. To interrupt this driving action the lever is moved in the direction of the arrow A (Fig. 1) which will cause the aperture 14 to guide the belt laterally and disengage it from the pulley. During this movement the belt receiving means 16 of the arm 15 moves out from within the flange of the pulley into position to receive the belt and hold it substantially along the edge of the flange in readiness to be reapplied to the pulley when the lever is moved in the opposite direction. When the stationary belt receiving and holding means is used, a portion of the belt is held in position by it when disengaged from the pulley. When it is desired to reapply the belt to the pulley, the operating lever 4 is shifted in the direction of the arrow B (Fig. 1) whereupon the aperture 14 guides the belt upon the periphery of the pulley and since the belt is held in position substantially along the flange of the pulley, the rotation of the pulley will cause the belt to climb upon it and resume its normal driving relation therewith. During this shifting movement that portion of the belt receiving and holding means which is carried by the operating lever passes within the flange of the pulley.

It will thus be seen that my improved belt shifter can be cast substantially in the shape and size desired without the necessity of machine work, such as is necessary with idle pulleys and the like, thus providing a device which is simple and of low cost of manufacture.

It is obvious that various modifications may be made in the construction, as illustrated in the drawing and above particularly described within the principle and scope of my invention.

I claim:

1. A belt shifter comprising, in combination with a pulley, a pivoted operating lever, a guide portion carried by the lever through which the belt passes, an arm carried by the lever in proximity to the periphery of the pulley and substantially conforming thereto, said arm being provided with belt receiving and holding means.

2. A belt shifter comprising a shiftable operating member, having thereon a belt guide and belt receiving and holding means also carried by the member, said means passing within the flange of the pulley when the belt is shifted into driving engagement with the pulley.

3. A belt shifter comprising a shiftable operating member having thereon a belt guide, and belt receiving and holding means also carried by the member, said means being disposed along the flange of the pulley and including a portion projecting laterally from the lever and passing within the flange of the pulley when the lever is shifted to cause driving engagement of the belt and pulley.

4. The combination with a support, a shaft rotatably mounted therein, a pulley on said shaft, and a belt for said pulley, of mechanism for shifting said belt on and off of said pulley comprising a shiftable operating member on said support having a belt guide, and belt receiving and holding means also carried by the operating member, and an arm carried by the support for also receiving and holding the belt when it is disengaged from the pulley.

5. The combination with a support, a shaft rotatably mounted therein and carrying a pulley, and a belt for said pulley, of mechanism for shifting said belt on and off of said pulley comprising a shiftable operating member on the support having a belt guide, and belt receiving and holding means, also carried by the shiftable member, said means passing within the flange of the pulley when the belt is shifted on the pulley and passing out of the flange into position to receive and hold the belt ready for reengagement with the pulley when the operating member is moved to disengage the belt from the pulley and an arm carried by the support and adjacent the flange of the pulley for also receiving and holding the belt when it is disengaged from the pulley.

6. A device for applying a belt to and removing it from a pulley comprising an operating member having a belt guide for positively shifting the belt in both directions toward and away from the pulley and also having a belt receiving portion shiftable therewith in the same directions for receiving the belt when it is removed from the pulley and holding the same in a position to be readily reapplied to the pulley when the belt guide of the operating member is again shifted toward the pulley.

In witness whereof I hereunto subscribe my signature.

CORNELIUS E. LOOSE.